United States Patent [19]
LaClair

[11] Patent Number: 5,399,876
[45] Date of Patent: Mar. 21, 1995

[54] OPTICAL POINT LEVEL SENSOR WITH LENS

[75] Inventor: Robert D. LaClair, Richmond, Vt.

[73] Assignee: Simmonds Precision Products, Inc., Akron, Ohio

[21] Appl. No.: 206,296

[22] Filed: Mar. 3, 1994

[51] Int. Cl.$^6$ .......................... G01N 21/49; G02B 6/02
[52] U.S. Cl. ..................................... 250/577; 250/903; 73/293
[58] Field of Search ............... 250/564, 574, 577, 900, 250/902, 903, 227.14, 227.21, 227.25; 356/136; 73/293; 359/652, 654

[56] References Cited

U.S. PATENT DOCUMENTS

| | | | |
|---|---|---|---|
| 3,864,577 | 2/1975 | Pellett et al. | 250/577 |
| 4,286,464 | 9/1981 | Tauber et al. | 73/293 |
| 4,713,552 | 12/1987 | Denis et al. | 250/577 |
| 4,853,547 | 8/1989 | Bach | 250/458.1 |
| 4,979,797 | 12/1990 | Nemeth | 250/577 |
| 4,998,022 | 3/1991 | Tregay | 250/577 |
| 5,149,962 | 9/1992 | Maurice | 250/227.17 |
| 5,159,834 | 11/1992 | Eisele | 73/293 |
| 5,278,426 | 1/1994 | Barbier | 250/577 |

FOREIGN PATENT DOCUMENTS 58-26226 2/1983 Japan .

*Primary Examiner*—David C. Nelms
*Assistant Examiner*—John R. Lee
*Attorney, Agent, or Firm*—Leonard L. Lewis; William E. Zitelli

[57] ABSTRACT

An optical point level sensor for fluids includes a prism exposable to a fluid such that electromagnetic energy is reflected internally the prism dependent on the fluid level; and a lens optically connectable to an electromagnetic energy source and an electromagnetic energy detector such that electromagnetic energy from the source enters the lens at a first location axisymmetric to a second location where electromagnetic energy exits the lens to the detector. In one embodiment the lens is a GRIN lens.

22 Claims, 1 Drawing Sheet

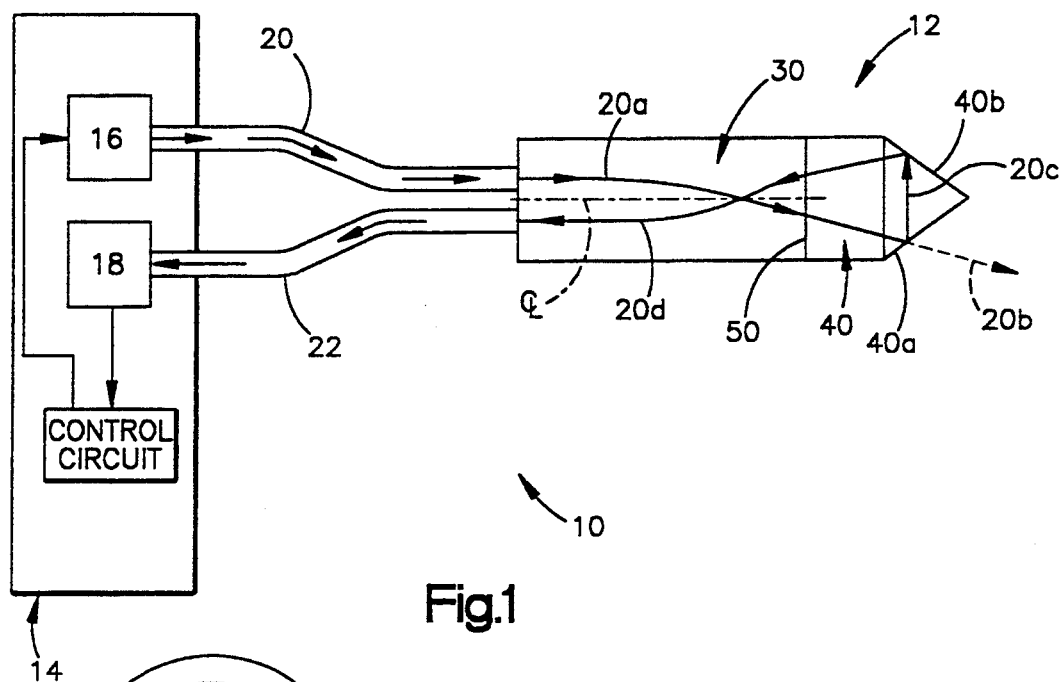
Fig.1
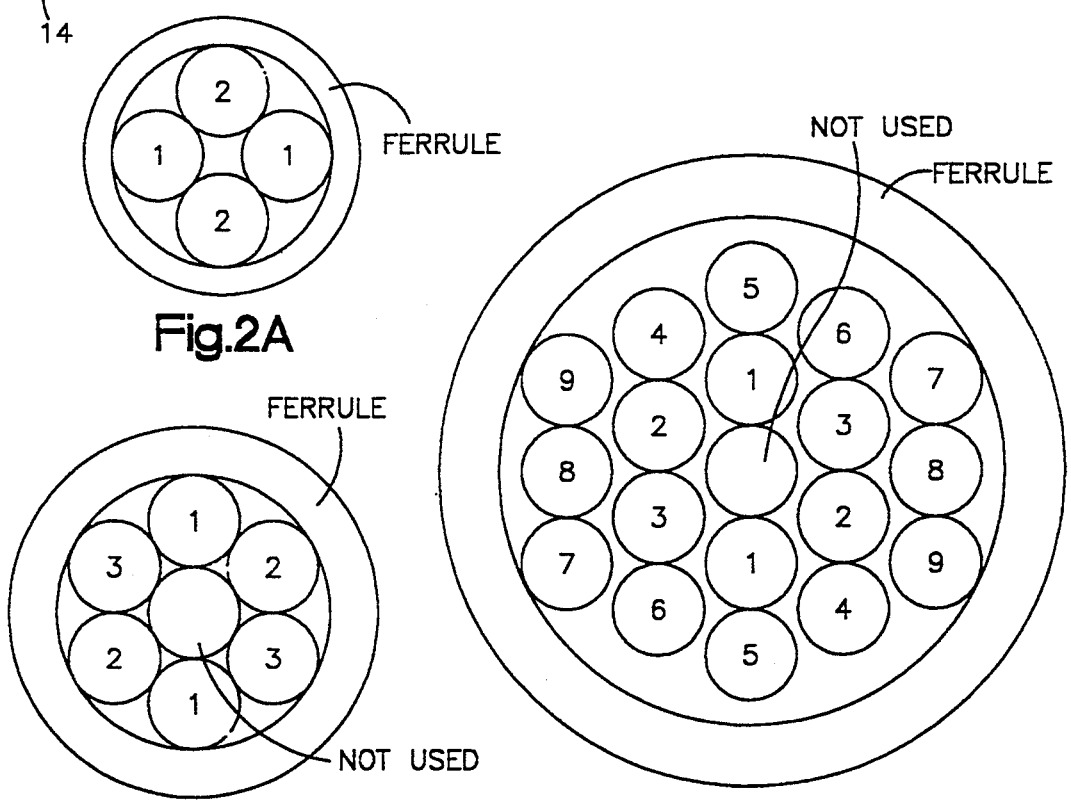
Fig.2A
Fig.2B
Fig.2C

OPTICAL POINT LEVEL SENSOR WITH LENS

BACKGROUND OF THE INVENTION

The invention relates generally to optical sensors for determining fluid levels. More particularly, the invention relates to point level sensors of the type that use prisms for reflecting light internally to indicate fluid level.

Optical fluid point level sensors are well known. Such sensors commonly use a prism having a conical tip. The prism is transparent to a beam of light launched into the prism from a light source, such as an LED. The light travels through the prism towards a surface of the conical tip and impinges on the surface at a determinable angle of incidence. The prism is made of a material that has a refractive index such that there exists a critical angle of incidence at which light is internally reflected to another surface and back to a photodetector, such as a phototransistor. Whether such internal reflection occurs depends on the refractive index of the fluid to which the conical tip is exposed and the angle of incidence. The critical angle is defined by the following equation:

$$\theta_c = \sin^{-1}(n_2/n_1) \qquad \text{Eq. 1}$$

where $n_2$ is the index of refraction of the fluid, and $n_1$ is the index of refraction of the prism conical tip. Thus, for air, $n_2 = 1.00$ and for glass, $n_1 = 1.50$. Accordingly, for total internal reflection the critical angle with respect to an air/glass interface is 42°. By comparison, if the conical tip is exposed to water as the fluid, the refractive index of water is 1.33. Thus the critical angle for total internal reflection with respect to a glass/water interface is about 62.5°.

By forming the conical surfaces such that the light transmitted therethrough is incident at 45°, the light will undergo total internal reflection (hereinafter "TIR") when the conical tip is exposed to air (because 45° is greater than the critical angle of 42° for a glass/air interface), but will not undergo TIR when the conical tip is exposed to water (because 45° is less than the critical angle of 62.5° for a glass/water interface). By positioning a light detector to receive the light that is internally reflected, the prism can be used as a point level detector for the water level. The transmitted light that is not internally reflected is refracted into the fluid, as is well known.

Note that for TIR to occur, the refractive index of the conical tip must be higher than the refractive index of all fluids which are to be detected (in this example, air and water).

Such a prismatic sensor can also be used to detect an aircraft fuel/air interface when the prism material is made of a higher refractive index such as 1.65, because the index of refraction for fuel is on the order of 1.4 to 1.5. Thus, it is known to use such sensors for fuel level detection by detecting the ullage/fuel interface at different levels in a fuel tank.

Conventional optical point level sensors typically include the light source and detector in close proximity to the prism. The light sources and detectors, however, are commonly solid state devices that are sensitive to temperature variations. Therefore, using the source and detector near the prism may expose the solid state devices to adverse environmental conditions in some applications.

To reduce the environmental effects, it is also known to couple light to and from the prism with an optic fiber. This allows the photosensitive devices to be located remote from the prism in a less hostile environment, such as an electronics bay, for example.

All of the aforementioned known designs suffer from the problem that the light launched into the prism tends to scatter and spread, such that even under conditions of TIR, very little light is returned to the detector. Although lenses have been proposed to collimate the light into the prism, such as discussed in U.S. Pat. No. 5,159 834 issued to Eisele, such designs do not provide multichannel operation or require the use of expensive components per channel.

The objectives exist, therefore, to provide an optical fluid point level sensor that produces a higher intensity optical output than known heretofore, and further makes available multichannel operation and redundancy. Such a sensor preferably will use a reduced number of optical components within a reduced envelope so as to reduce sensor cost and simplify manufacture and use.

SUMMARY OF THE INVENTION

To meet the foregoing objectives, the present invention contemplates, in one embodiment, an optical point level sensor for fluids comprising prism means exposable to a fluid such that light is reflected internally the prism means dependent on the fluid level, and a GRIN lens optically connectable to light source and detector means; the GRIN lens being optically coupled to the prism means.

In another embodiment, the invention contemplates an optical point level sensor for fluids, comprising: prism means exposable to a fluid such that electromagnetic energy is reflected internally the prism means dependent on the fluid level; and a lens optically connectable to an electromagnetic energy source and an electromagnetic energy detector such that electromagnetic energy from the source enters the lens at a first location that is different from a second location where electromagnetic energy exits the lens to the detector; the lens being optically coupled to the prism means.

These and other aspects and advantages of the present invention will be readily understood and appreciated by those skilled in the art from the following detailed description of the invention with the best mode contemplated for practicing the invention in view of the accompanying drawings.

BRIEF DESCRIPTION OF THE DRAWINGS

FIG. 1 is an elevation and illustrates the invention in simplified schematic form; and FIGS. 2A–2C illustrate various alternative fiber cable configurations suitable for use with the invention.

DETAILED DESCRIPTION OF THE INVENTION

With reference to FIG. 1, an embodiment of an optical fluid point level sensing apparatus is generally designated with the numeral 10. Such apparatus is particularly well suited, for example, for detecting fuel levels in an aircraft fuel tank. Although the invention is described herein with particular reference to its use in aircraft fuel tank applications, such description is intended to be exemplary and should not be construed in a limiting sense. Those skilled in the art will readily appreciate that the advantages and benefits of the invention, as will be apparent from the following description, can be realized in numerous other applications as well.

The apparatus 10 includes an optical sensor 12 and an electronics unit 14. In this particular embodiment of the invention, the electronics unit 14 may be located remote from the sensor 12, such as in an avionics bay in an aircraft. The unit 14 includes an electromagnetic energy source 16, such as a conventional light emitting diode, for example. The unit 14 also includes an electromagnetic energy detector 18, such as a conventional phototransistor or another LED, for example. Other alternatives will be readily apparent to those skilled in the art. For example, the invention is not limited to the use of any particular wavelength of electromagnetic energy. Further, the same device could be used as both a source and detector for electromagnetic energy, as taught in U.S. Pat. No. 5,149,962 issued to Maurice.

The light source 16 is optically coupled to one end of a first optic fiber cable 20. The opposite end of the cable 20 is optically coupled to the sensor 12. One end of a second optic fiber cable 22 is optically coupled to the light detector 18. The opposite end of the second cable 22 is also optically coupled to the sensor 12. Although the invention is illustrated herein as using optic fibers to couple the light source and detector to the sensor 12, those skilled in the art will appreciate that the source and detector could be disposed near or adjacent the sensor 12 if so desired, for a direct coupling therebetween. A particular advantage of the illustrated embodiment is that all the electronics can be located remote from hostile environments. For example, in a fuel tank, the sensor 12 could include only the optical elements coupled by optic fibers so that the light source and detector would not be exposed to extreme temperatures. By using only optical elements inside the fuel tank, there is no need for long electrical wiring between the sensor and the electronics, thereby reducing system sensitivity to electromagnetic interference.

The electronics unit 14 can be a stand alone unit or part of an overall fuel management or avionics hardware. The electronics unit provides electrical energy to the source 16 and also detects an output characteristic of the detector 18, based on the intensity of light incident thereon. In this manner the electronics unit can determine the sensor condition as to whether the sensor is exposed to liquid or air based on the amount of light that is returned to the detector. Of course, the apparatus 10 could also be used to detect an interface level between two liquids if so desired.

The design of the electronics unit 14 will depend on the particular application of the invention. However, as one example, a suitable electronics design is described in copending U.S. patent application Ser. No. 08/167,742 filed on Dec. 15, 1993 for OPTICAL LIQUID LEVEL SENSOR AND DISCRIMINATOR, the entire disclosure of which is fully incorporated herein by reference, and which application is owned in common by the assignee of the present invention.

The sensor 12 can be arranged to be installed in a tank or other fluid container by mounting a housing (not shown) for the sensor to a wall of the container.

The sensor 12 includes a lens 30 and a prism 40 optically coupled to the lens. A preferred lens is a Graded Index lens, or GRIN lens. A suitable lens is available from NSG, Inc., SELFOC ®, as part number W1.8-.29-B2-83. In accordance with an important aspect of the invention, the lens is selected such that the light (indicated by the ray trace 20a) launched into the lens from the cable 20 bends and travels across the centerline of the lens 30 into the prism 20 so as to impinge on a first conical surface 40a. If the surface 40a is exposed to a fluid such that the light impinges on the surface 40a at an angle less than the critical angle, light will refract into the fluid such as represented by the trace 20b. If the surface 40a is exposed to a fluid (such as air, for example) such that the light impinges the surface at an angle greater than the critical angle, the light will be reflected internally as represented by the trace 20c.

The internally reflected light reflects off of an opposite conical surface 40b and re-enters the lens 30 (along the ray trace 20d). The light will again be bent by the lens across the centerline and exit the lens at a location that is different than the location that the light entered the lens from the first cable 20. The reflected light travels from the lens 30 into the second optic fiber cable 22 back to the detector.

By choosing a GRIN lens with a particular pitch, such as for example 0.29, the lens will bend the light across the centerline or axis of the lens so that the light enters and exists the lens at axisymmetric positions. This is a useful feature in the design of the sensor because the 0.29 pitch GRIN lens performs as a reciprocal lens, that is, the light emitted from any off-axis input fiber will be returned to a diametrically-opposed output fiber off-axis by a like amount, as illustrated in FIG. 1. The fibers 20,22 can be positioned axisymmetrically with respect to the center axis of the lens 30 by the use of a ferrule or other suitable means.

Although only a single fiber pair (one input fiber and one output fiber) are shown in the embodiment of FIG. 1, the use of a reciprocal lens allows for the use of any radially-symmetric fiber bundle containing diametrically-opposed fiber pairs for multichannel applications. A fiber bundle with multiple optic fiber pairs and the GRIN lens are coaxially aligned with the gap between the polished face of the fiber bundle and the face of the GRIN lens determined by the pitch of the GRIN lens (in the case of the 0.29 pitch example, the appropriate gap is approximately 0.036 inches).

FIGS. 2A-2C illustrate three different embodiments for multichannel fiber bundles. Note that in FIGS. 2A-2C the physical spacing between optic fibers is exaggerated in some instances. In actual practice, each fiber typically will contact its adjacent fibers. FIG. 2A shows a two channel embodiment that utilizes four fibers (in FIGS. 2A-2C the fiber pairs are identified with corresponding fiber numbers) including two input fibers and corresponding two output fibers. FIG. 2B illustrates a three channel version that uses seven fibers, six of which form the three channel pairs and the seventh fiber being centrally disposed and unused. FIG. 2C is similar to FIG. 2B but for a nine channel design. Note in all the embodiments herein that the corresponding fiber pairs are disposed in a radially symmetric configuration so that the fibers can be axisymmetrically disposed with respect to the lens by coaxially aligning the fiber bundle and the GRIN lens.

A significant advantage of the invention is that multiple focussed input and output optical beams can be accommodated by a single GRIN lens.

The invention is not limited to the utilization of a 0.29 pitch GRIN lens. Any GRIN lens pitch which causes the light beam to cross over the axis of the lens and focus on the output fiber (i.e., a reciprocal pitch) may be utilized. Use of other reciprocating pitches may require the adjustment of the conical tip angle or the overall length of the prism 40 for proper operation. The beam(s) impinging on the prism face may or may not be collimated or paraxial depending on the particular design configuration.

It should also be noted that the size (diameter) of the GRIN lens may need to be increased when using the larger fiber bundles. GRIN lenses are presently commercially available in diameters from one to four millimeters.

The invention thus allows several channels to interrogate a single lens, which would not be possible, for example, with a conventional planoconvex lens.

Those skilled in the art will appreciate that by using a GRIN lens with a 0.29 pitch, the light from an off-axis input fiber is not collimated by the lens, but rather is bent towards and focussed near or at the conical surface 40a. This substantially improves the amount of light that can be reflected back to the detector under TIR conditions.

The prism 40 can be made of any suitable material that is compatible with the fluids that the prism will be exposed to. For example, as described in the referenced co-pending application, polyethersulfone is a suitable material for a sensor that will be exposed to aircraft fuel. Other suitable materials include polysulfone and Schott glass, for example.

In the described embodiment, because the 0.29 pitch GRIN lens 30 does not collimate the light as it travels therethrough, the optimum angle of incidence in the described example is about 43°, rather than the more typical 45° used in conventional optical point level sensors. Of course, the particular conical angles and materials selected will depend on each particular application.

The GRIN lens is typically cylindrical in shape with opposite flat circular ends. The prism can be formed from a cylindrical plug with the conical tip formed on one end thereof, with the opposite end provided with a flat circular diameter similar to the lens so as to simplify optically coupling the two parts. The lens/prism interface 50 can be prepared by polishing the flat ends thereof in a conventional manner and joining them with an adhesive or mechanically holding them together with a housing, for example. The optical cables 20,22 or multifiber bundles can be coupled to the GRIN lens 30 such as by the use of a ferrule or other suitable means, as previously described herein.

The invention permits the realization of a small optical point level sensor as compared to conventional non-lensed designs. For example, transducer designs as small as 1.5 mm in diameter and 15 mm in length can easily be accommodated. This feature permits such a sensor to be used in applications that require small envelope dimensions, such as for example, small pipes and fuel lines where minimal flow restriction is required.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. An optical point level sensor for fluids, comprising: prism means exposable to a fluid such that electromagnetic energy is reflected internally said prism means dependent on the fluid level; and a lens optically connectable to an electromagnetic energy source and an electromagnetic energy detector such that electromagnetic energy from said source enters said lens at a first location different from a second location where electromagnetic energy exits said lens to said detector; said lens being optically coupled to said prism means.

2. The sensor of claim 1 wherein said lens comprises a GRIN lens.

3. The sensor of claim 1 wherein said lens focusses electromagnetic energy at a predetermined location in said prism means.

4. The sensor of claim 1 further comprising optic fiber means for optically coupling said lens to said source and detector.

5. The sensor of claim 4 wherein said optic fiber means comprises a first fiber that couples a light source to said lens and a second fiber that couples a light detector to said lens wherein each fiber has a terminal end coupled to said lens at axisymmetric locations on a surface of said lens.

6. The sensor of claim 1 wherein said lens comprises a GRIN lens with a pitch such that input electromagnetic energy crosses the lens center axis and when internally reflected exits the lens at an axisymmetric location with respect to the input location.

7. The sensor of claim 1 wherein said prism means comprises polyethersulfone, polysulfone or Schott glass.

8. The sensor of claim 1 wherein said prism means includes a conical tip with a predetermined angle of incidence for input light incident thereon.

9. The sensor of claim 1 wherein said first and second locations are axisymmetric with respect to the lens center axis.

10. The sensor of claim 1 further comprising an optic fiber bundle having at least two optic fiber input/output pairs that are positioned in a radially symmetric manner with respect to each other.

11. The sensor of claim 10 wherein each of said input/output fiber pairs are diametrically opposed so that when said bundle is optically coupled to said lens said pairs are axisymmetrically aligned with respect to said lens center axis.

12. The sensor of claim 11 wherein said bundle and said lens are coaxially aligned.

13. An optical point level sensor for fluids comprising: prism means exposable to a fluid such that light is reflected internally said prism means dependent on the fluid level, and a GRIN lens optically connectable to light source and detector means; said GRIN lens being optically coupled to said prism means.

14. The sensor of claim 13 wherein said lens focusses light into said prism means.

15. The sensor of claim 14 wherein said lens is optically coupled to said prism means so as to launch light into said prism means and to receive reflected light out of said prism means.

16. The sensor of claim 15 wherein said lens is generally cylindrical in shape with an end surface optically coupled to said prism means.

17. The sensor of claim 16 wherein said prism means comprises a prism having a conical tip at one end and a generally flat circular surface at another end; said lens having one end thereof in optical contact with said prism flat surface.

18. The sensor of claim 17 further wherein light enters said lens at a first location and exits said lens at a second location that is axisymmetric with said first location.

19. The sensor of claim 18 wherein said prism comprises polyethersulfone, polysulfone or Schott glass.

20. The optical sensor of claim 13 further comprising optic fiber means for optically coupling said lens with said light source and detector means.

21. The optical sensor of claim 20 wherein said optic fiber means comprises first and second fiber connections; each fiber connection being terminated at a separate position with respect to said lens so that light enters and exits the lens at axisymmetric locations.

22. The optical sensor of claim 20 wherein said optic fiber means comprises a radially symmetric optic fiber bundle that can be coaxially aligned with the lens.

* * * * *